United States Patent [19]

Mechalas

[11] 4,200,530
[45] Apr. 29, 1980

[54] ROTARY FILTER

[76] Inventor: Emmanuel Mechalas, c/o Modern Machine Shop, Inc. 124 N. Hazel St., Danville, Ill. 61832

[21] Appl. No.: 930,047

[22] Filed: Aug. 1, 1978

Related U.S. Application Data

[63] Continuation-in-part of Ser. No. 798,878, May 20, 1977, abandoned.

[51] Int. Cl.² .............................................. B01D 33/10
[52] U.S. Cl. ......................................... 210/77; 210/81
[58] Field of Search ................. 210/77, 107, 108, 358, 210/359, 393, 394, 402, 403, 526, 396, 81, 79

[56] References Cited

U.S. PATENT DOCUMENTS

| | | | |
|---|---|---|---|
| 2,911,098 | 11/1959 | Leithiser | 210/396 |
| 3,936,378 | 2/1976 | Kawada | 210/107 |

FOREIGN PATENT DOCUMENTS

| | | | |
|---|---|---|---|
| 2079452 | 11/1971 | France | 210/402 |
| 290284 | 5/1971 | Sweden | 210/402 |

*Primary Examiner*—Frank Sever
*Attorney, Agent, or Firm*—Neal J. Mosely

[57] ABSTRACT

A filtration system in which the filtering member is disposed on the circumferential surface of a drum shaped member. The drum shaped member is rotated at a constant velocity about a horizontal axis. A mixture of liquid and solids to be filtered is discharged under pressure within the drum shaped member against the surface of the filtering member. The liquid which filters through the screen is received in a reservoir, the level of which is maintained below the surface of the filtering member. The solids adhere to the surface of the filtering member and rotate therewith until dislodged into a hopper for subsequent discharge. Upon discharge from the drum shaped member, the solids can be compressed or made to travel an upwardly inclined path to drain excess liquid therefrom.

1 Claim, 3 Drawing Figures

ROTARY FILTER

BACKGROUND OF THE INVENTION

This application is a continuation-in-part of copending application Ser. No. 798,878, filed May 20, 1977, now abandoned.

The present invention relates to liquid filtration methods and systems. More particularly, it relates to filtration methods and systems in which a mixture of solids and liquid is filtered through the use of a continuously revolving filter member and the separated components of the mixture are conveyed to different locations for further utilization and/or discharge.

Numerous manufacturing processes as well as city sewerage systems produce waste in the form of a mixture of solids and a liquid, usually water. In food processing plants, for example, it is not uncommon for such a solid containing effluent to be produced during the processing of the foods. Such liquid-solid mixtures commonly contain a large volume of liquid and a small percentage of solids. In most instances the solids are useful by-produce of the process, e.g. feed for livestock, fertilizer, etc., if the solids can be separated from the mixture. Moreover, the liquid may be reusable or at least may be suitable for discharge with little further processing if the solids can be removed.

For the most part, such liquid-solid mixtures can be separated by filtration. For example, most of the "sludge" can be removed from sewerage effluent by a filtering process as can fibers and other solids in waste water from manufacturing plants. However, it has been heretofore complex and costly to separate solids from such mixtures with a degree of efficiency that allows all the plant or sewerage discharge to be continuously filtered at a cost that permits economical recovery of the solids and/or liquids.

Among the many systems that have been devised to separate solids from liquids are filtration systems in which a mixture of liquid and solids are separated by a moving filter member such as a drum shaped screen member, and the separated solids are conveyed to a discharge point through movement of the filter. One such system, as exemplified by U.S. Pat. No. 859,857 to Tracy, operates as a centrifugal machine. The mixture is introduced into the drum shaped screen member and the member containing the mixture is rotated at a relatively high velocity to expel the liquid through the screen member by centrifugal force. Thereafter, the rotation of velocity of the drum shaped screen member is slowed to allow the solid material remaining therein to be conveyed to a discharge point. As can be seen, the centrifugal system of the Tracy patent utilizes a three step process which requires a complicated and costly speed changing mechanism for at least two of the steps. In addition, the mixture can not be continuously introduced into the drum shaped screen member, i.e. is only introduced during the first step of the process, and considerable time is lost. The complexity is further increased by the need for timing the three process steps so that they are carried out in the correct sequence and in the correct time relationship. Furthermore, operation at high speeds increase the rate of wear of the machine elements, calling for more frequent maintenance.

Other filtration systems utilizing a drum shaped screen member with the mixture to be filtered being introduced into the interior of the member are exemplified by U.S. Pat. Nos. 2,891,671 to Nilsson, 2,450,522 to J. P. North and 1,217,207 to R. A. North. In these systems, the mixture to be filtered is discharged into the drum shaped screen member, and the liquid filters through the screen into a receiving tank from which it is thereafter discharged, while the solid material is transported within the rotating screen member to a hopper located in the upper portion of the drum shaped screen member. The solid material is then conveyed to the outside of the screen member by a screw conveyor or the like.

As explicitly shown by the patent to Nilsson, the level of the liquid in the receiving tank is above the bottom surface of the screen member, thereby exerting an upward buoyancy on the solids in the mixture and preventing firm contact between the solids and the screen member. Some of the solids may, in fact, float in the mixture and only incidently make contact with the screen member.

To counteract this problem of lack of adhesion of the solids to the screen member, all of the above mentioned systems require some form of inwardly protruding bucket or shelf within the screen member to aid in transporting the solids to the hopper. Moreover, these systems may resort to the use of baffles or other complex structures to collect the solids against the screen member. These elements, in addition to adding to the cost of materials and manufacture of the drum, are less than totally effective in conveying all of the solids within the drum to the hopper because of their necessarily limited size and surface contact with the solids.

OBJECTS AND BRIEF SUMMARY OF THE INVENTION

Accordingly, it is an object of the present invention to provide a novel method and apparatus for filtering mixed liquids and solids which separates and discharges the two with a high rate of efficiency.

It is another object of the invention to provide a novel method and apparatus for filtration of a liquid-solid mixture in which a continuous filter member is operated at a substantially constant rate of speed to eliminate the need for costly speed changing mechanisms and interruptions in the flow of the mixture into the apparatus.

It is a further object of the invention to provide a novel method and apparatus for filtration of a liquid-solid mixture in which a continuous filtering member is moved at a substantially constant velocity while being kept out of contact with the filtered liquid to increase the ease and rate of discharge of solid material over prior art systems.

It is yet another object of the invention to provide a novel method and apparatus for filtration in which adhesion of solids to the surface of a screen is increased to further increase the rate of discharge of the solids.

It is yet a further object of the invention to provide a novel method and system for more efficient, more complete separation of a liquid-solid mixture through filtration.

These and other objects and advantages are achieved in accordance with the present invention through the use of a filtering means such as a screen which travels through a predetermined path at a constant rate of speed. At one point in the path the mixture to be filtered may be discharged directly onto a portion of the filtering means at a relatively high velocity produced by application of pressure to the mixture. The high velocity causes the liquid to pass through and the solids in the mixture to adhere to the surface of the fitering means with a greater degree of adhesion than would occur solely due to the effect of gravity on the solids. This enables the solids to travel with the filtering means along its path until dislodged at a point downstream in the path, notwithstanding the relative location of the filtering and the solids and, in the preferred embodiment, without the need for additional structure.

Further in accordance with the invention, the liquid which filters through the filtering means is received in a container which maintains the level of received liquid below the surface of the filtering means at the point through which the received liquid has filtered. This prevents the system from operating in a bath, which decreases efficiency as mentioned previously.

According to the illustrated embodiments of the invention, the filtering means is a screen located on the circumferential surface of a drum. The drum is rotated at a constant velocity about a horizontal axis and the mixture is discharged downwardly under pressure within the drum. The filtered liquid is received in a reservoir which maintains the level of received fluid below the drum. The solids rotate with the drum surface to which they adhere until they are dislodged at the top of the drum by an air stream and fall into a hopper. The hopper structure which discharges the solids from within the drum is constructed in one form of the invention to cause the solids to move along an upwardly inclined path or to compress the solids and to allow further drainage to excess liquid therefrom.

DETAILED DESCRIPTION

Figure 1:
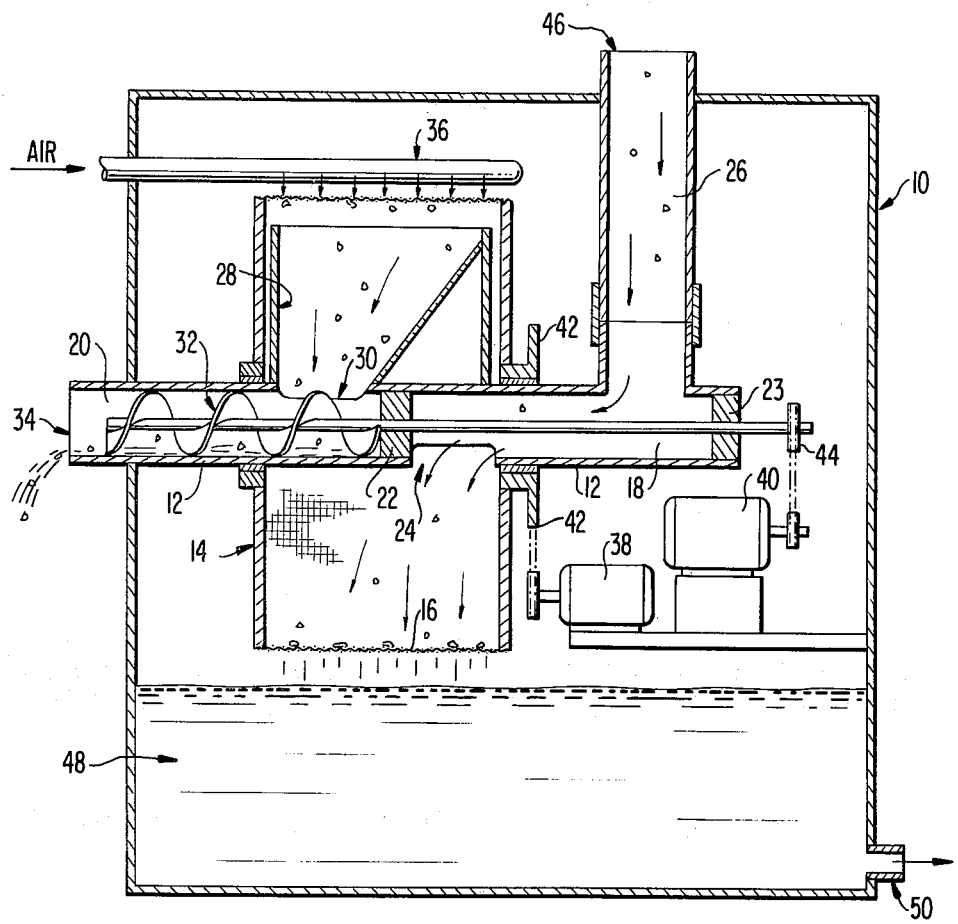
FIG. 1 is a view in elevation and in partial cross section of one embodiment of the invention in which a filtering screen forms the circumferential surface of a drum.

FIG. 1 illustrates a preferrred embodiment of the invention in which a filtering means forms the circumferential surface of a drum. Located within a main housing 10 is a hollow shaft 12. A drum shaped member 14 is journaled for rotation about the shaft 12 on suitable bearings. An endless belt or web of filtering material 16 forms the circumferential surface of the drum shaped member and suitable reinforcing members may be provided as needed. The filtering material 16 can be a screen, an apertured sheet, a porous web, heavy paper or other such material which is pervious to liquid in a mixture of solids and liquid to be filtered and is substantially impervious to solids. It will be appreciated that the type of filtering material used will depend on the nature of the mixture and the extent to which the solids are to be removed.

The hollow shaft 12 is divided into two conduits 18 and 20 by suitable sealing mechanisms 22 and 23. The righthand conduit 18, as viewed in FIG. 1, has a discharge port 24 which opens into the interior of the drum 14. Conduit 18 in combination with conduit 26 forms an inlet tube through which a mixture containing solids and liquids is introduced, under pressure into the interior of drum 14 and onto the lower circumferential surface of filtering material 16.

Located within the drum above its central axis is a hopper 28 fixed to and supported by the hollow shaft 12. The hopper is disposed so as to collect solids which are dislodged from the upper interior surface of filtering material 16 and deposit them in conduit 20 via port 30. A conveying means in the form of an auger 32 is disposed within the conduit 20 coaxial therewith. The auger 32 transports the solid particles from within the drum to discharge port 34 outside of the main housing 10 through the conduit 20. Conduit 20 is a tube of uniform cross section. Auger 22 has a helical flight which is a uniform helix. A slightly expanding helical flight may be used, if desired, but a contracting helix or a tapering (narrowing) conduit will cause the solids to compress and jam.

At the uppermost point of travel of filtering material 16, a stream of pressurized air is directed against the exterior surface of the material by suitable means such as an apertured tube 36. This force dislodges the solid particles which adhere to the filtering material and causes them to fall into the hopper 28. Apertured tube 36 extends across the entire width of filter material 16 and is uniformly spaced from the surface thereof at all stages of rotation of the drum (due to the cylindrical surface thereof). This permits application of uniform air jets against all points on the exterior surface of the filter.

Drum 14 and auger 32 are rotated about a common axis at substantially constant rotational velocities by means of suitable driving means such as motors 38 and 40, respectively, through gears or other suitable coupling mechanisms 42 and 44.

In operation, a mixture containing solids and liquid which are to be separated is introduced into conduit 26 through inlet port 46 and flows through conduit 18 and out discharge port 24 into the interior of rotating drum 14. Inside the drum, the solid particles are trapped by and adhere to the surface of the filtering material 16 at the circumferential surface of the drum while the liquid flows therethrough. Since the drum 14 continuously rotates, a clean segment of the filtering material is continuously presented below the discharge port 24 where the mixture contacts the interior surface of the material 16. The liquid passing through the material 16 is received in a reservoir of filtered liquid 48, and thereafter discharged through outlet 50 to be discarded, utilized or further processed.

A significant feature of the invention lies in the fact that the level of the filtered liquid in reservoir 48 is never allowed to rise to the lowermost point in the rotation of circumferential surface 16 of drum 14. Were it to do so, some of the solid particles in the mixture would be suspended within the drum and would not adhere to the surface of the filter material 16, as discussed with regard to the prior art devices. The rate of discharge of liquid through outlet 50 must therefore be correlated with the rate at which the mixture is introduced into the device through inlet port 46 to assure that there is no contact between the received liquid and surface 16. This can be accomplished by appropriate size relationships between the inlet port 46 and the discharge outlet 50.

Within the drum the solid particles adhere to the surface of the filter material 16 and rotate with the surface 16 to the uppermost point of travel of the surface. There they are dislodged from the surface by the pressurized air stream from the apertured tube 36 and fall into the hopper 28. The dislodged solids are then conveyed to discharge port 34 through conduit 20 by means of auger 32 for further processing or utilization.

As mentioned previously, it has been found that the force of gravity alone is not always sufficient to cause the solid particles to adhere to the surface material 16 to enable them to be transported to the uppermost point of travel of the surface. For this reason, another important feature of the preferred embodiment of the invention resides in the introduction of the mixture under pressure to inlet port 46, by suitable pump means for example (not shown), or by gravity feed from well above the discharge port 24 (e.g. a pressure column or elevated storage tank). The pressure is applied so that the liquid stream strikes the surface of the filtering material 16 with sufficient velocity to cause the solid particles therein to adhere to the surface until they are dislodged by the pressurized air from pipe 36. The amount of pressure to be applied at the inlet to accomplish this result will in large part depend upon the nature of the solid particles within the mixture and the specific material which makes up the filtering surface 16.

Figure 2:
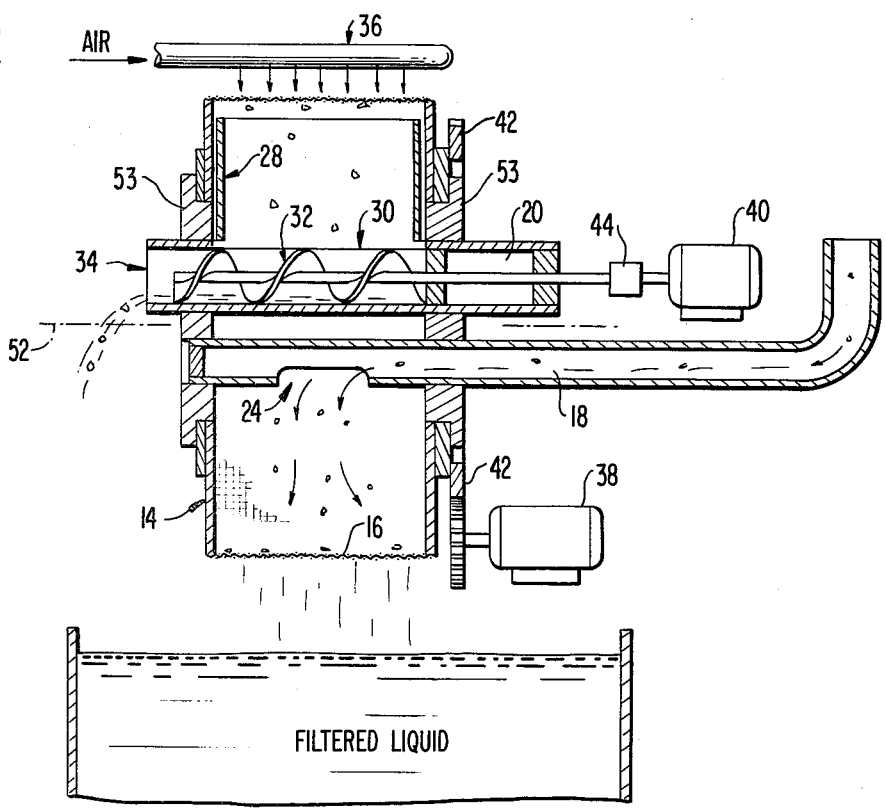
FIG. 2 is a view similar to that of FIG. 1 showing a second embodiment of the invention in which the discharge conduit and the unfiltered mixture tube are off-axis with respect to the drum to provide a larger discharge hopper.

FIG. 2 illustrates another form of the invention in which the inlet conduit 18 and the discharge conduit 20 are non-concentric. Specifically, conduits 18 and 20 are respectively located below and above the horizontal axis 52 of the drum 14, allowing each to be at least coextensive with the width of drum 14. The drum is journalled for rotation about the axis 54 on suitable support plates 53 secured to the housing 10 of FIG. 1 in a suitable manner.

The arrangement of FIG. 2 provides for a larger hopper port 30, enabling the side walls of the hopper 28 to be substantially vertical, as opposed to the embodiment of FIG. 1 in which one of the walls is inclined. Elimination of the inclined wall helps to prevent the bridging of separated solids, enabling easier conveyance thereof by the auger 32 through the conduit 20. In addition, the central location of the discharge port 24 permits more even distribution of the mixture over the lower interior surface of the filtering material 16.

Figure 3:
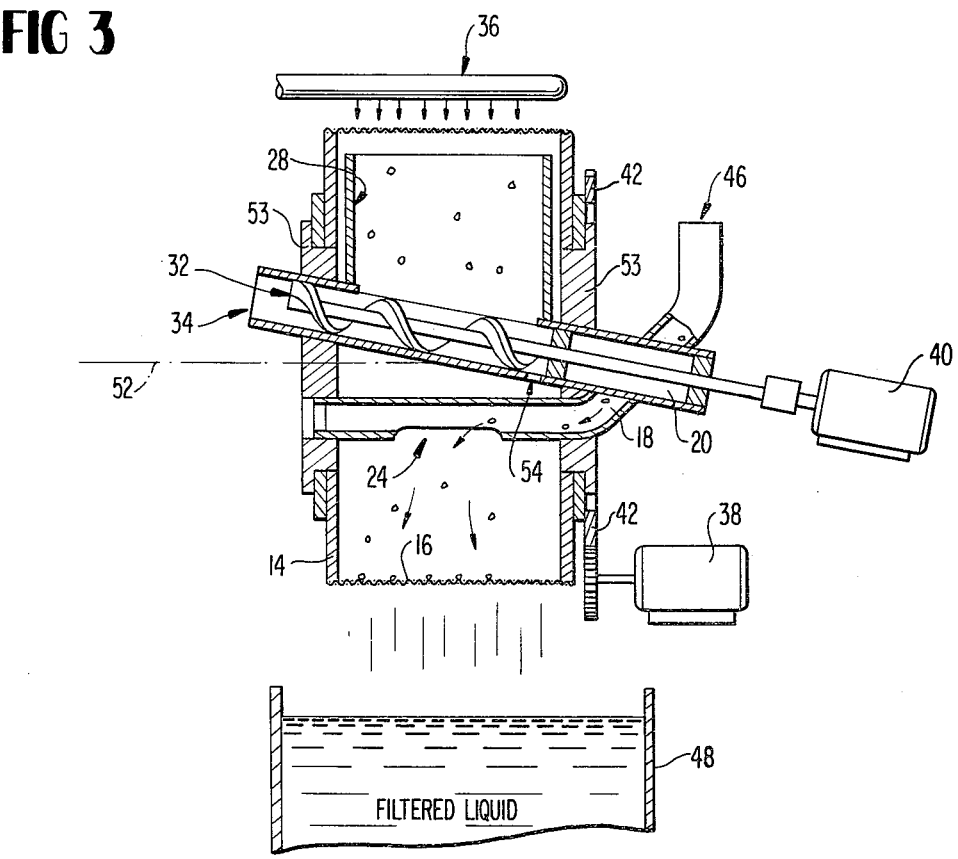
FIG. 3 is a view similar to that of FIG. 2 showing a third embodiment of the invention in which the discharge conduit is upwardly inclined to provide extra drainage of liquids.
Figure 4:
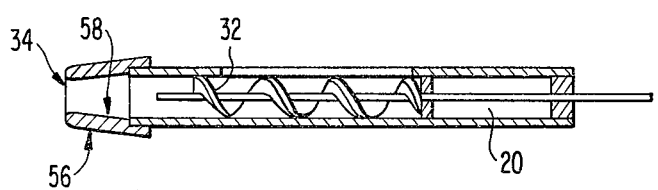

FIG. 3 illustrates a further modified form of the invention wherein the discharge conduit 20 is upwardly inclined to further remove liquid from the solids discharged into the hopper 28. In the FIG. 3 embodiment, conduits 18 and 20 are nonconcentric as in the embodiment of FIG. 2. In addition, conduit 20 is inclined with respect to the horizontal axis 52 and provided with an opening 54 at its lowermost end. With this arrangement, the solid particles dislodged from the filtering material 16 into the hopper 28 are conveyed from within the drum 14 along an upwardly inclined path. Excess liquid remaining in the separated solids is allowed to drain away during conveyance and to be returned to the interior of the drum 14 by opening 54 for passage through the filtering material 16 to the reservoir 48.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A method for separating solids from a mixture of solids and liquid comprising the steps of:
    providing a drum shaped member having imperforate end walls and a cylindrical peripheral surface that is pervious to the liquid in the mixture and impervious to the solids in the mixture,
    revolving the drum shaped member about a horizontally disposed axis at a substantially constant rotational velocity;
    discharging the mixture against the cylindrical surface of the drum shaped member from within the member at a high velocity such that all the liquid in the mixture immediately passes through said cylindrical surface and the solids strike and adhere to the circumferential surface of the member and revolve therewith;
    dislodging the solids from the circumferential surface of the member by application of a uniform jet of air thereto, into a hopper within the drum shaped member at a position above the level of the horizontal axis of the drum shaped member and conveying the dislodged solids through one of said imperforate walls to a discharge point outside the drum shaped member; and
    receiving the liquid passing through the circumferential surface of the drum shaped member at a level below the circumferential surface and draining said liquid away at a rate sufficient to prevent said level from contacting said circumferential surface.

* * * * *